United States Patent [19]
Kodaissi et al.

[11] Patent Number: 6,085,799
[45] Date of Patent: Jul. 11, 2000

[54] USE OF A BURIED FLEXIBLE PIPELINE

[75] Inventors: Elie Kodaissi, Rouen; Pascal Estrier, Saint Wandrille Rancon, both of France

[73] Assignee: Coflexip, Paris, France

[21] Appl. No.: 09/117,116

[22] PCT Filed: Dec. 24, 1996

[86] PCT No.: PCT/FR96/02077

§ 371 Date: Jul. 22, 1998

§ 102(e) Date: Jul. 22, 1998

[87] PCT Pub. No.: WO97/27416

PCT Pub. Date: Jul. 31, 1997

[30] Foreign Application Priority Data

Jan. 22, 1996 [FR] France ................................. 96 00656

[51] Int. Cl.[7] ................................................. F16L 11/08
[52] U.S. Cl. ........................... 138/135; 138/133; 138/134; 138/130
[58] Field of Search ..................... 138/135, 132, 138/133, 134, 129, 130, 144

[56] References Cited

U.S. PATENT DOCUMENTS

| | | | |
|---|---|---|---|
| 4,693,281 | 9/1987 | Creedon | 138/130 X |
| 4,860,798 | 8/1989 | Kovacs et al. | 138/130 X |
| 4,867,205 | 9/1989 | Bournazel et al. | 138/130 |
| 4,903,735 | 2/1990 | Delacour et al. | 138/133 |
| 5,024,252 | 6/1991 | Ochsner | 138/130 |
| 5,176,179 | 1/1993 | Bournazel et al. | 138/130 |
| 5,813,439 | 9/1998 | Herrero et al. | 138/135 X |

FOREIGN PATENT DOCUMENTS

| | | |
|---|---|---|
| 0147288 | 11/1987 | European Pat. Off. . |
| 0302784 | 2/1989 | European Pat. Off. . |
| 0489896 | 9/1994 | European Pat. Off. . |
| 2294380 | 7/1976 | France . |
| 2590958 | 6/1987 | France . |
| 2602300 | 12/1988 | France . |
| 9115694 | 10/1991 | WIPO . |
| 9200481 | 1/1992 | WIPO . |

OTHER PUBLICATIONS

C. Bournazel, Revue De L'Institut Francais du Petrole, *Vertical Des Conduites Ensouillees*, vol. 37, No. 1, Jan–Feb. 1982, pp. 113–117.

*Primary Examiner*—Patrick Brinson
*Attorney, Agent, or Firm*—Ostrolenk, Faber, Gerb & Soffen, LLP

[57] ABSTRACT

The use of a buried or covered flexible seabed pipeline for transporting fluids is disclosed. The pipeline comprises a sealing barrier (3) and reinforcing layers (4, 5) capable of withstanding mechanical stress and arranged around said sealing barrier. The reinforcing layers consist of at least two crosswise-arranged reinforcing plies (4, 5) of wires helically wound at respective winding angles $a_i$ to the longitudinal axis of the pipeline, such that they comply with the following relationships: when i=1, 2, . . . , $52° \leq a_i \leq 58°$. The arithmetic mean $a_m$ of said winding angles $a_i$ complies with the following relationship: $53° \leq a_m \leq 57°$.

8 Claims, 1 Drawing Sheet

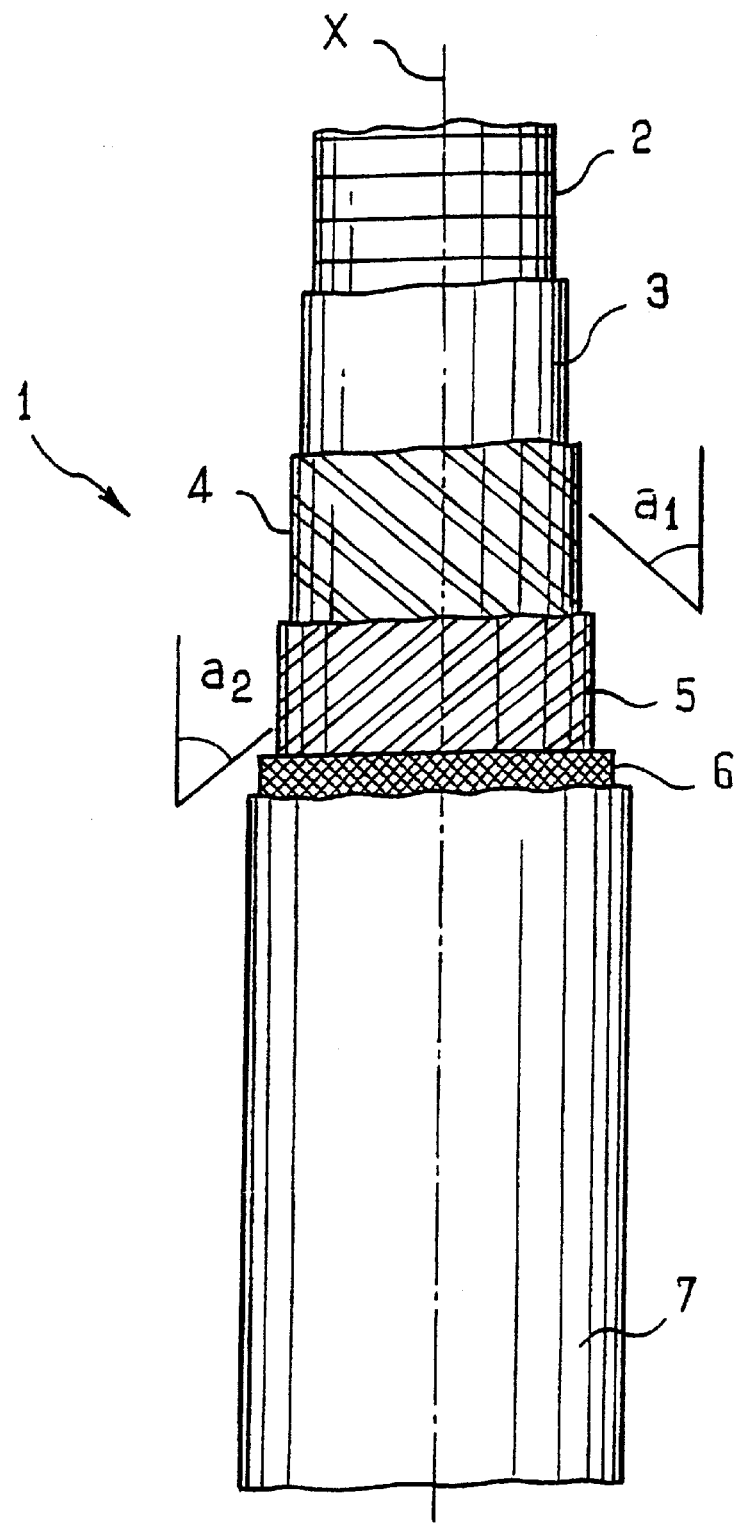
FIG_1

USE OF A BURIED FLEXIBLE PIPELINE

BACKGROUND OF THE INVENTION

The present invention relates to flexible pipelines used for transporting fluids, such as, for example, live crude oil, along the seabed between sub-sea operating installations or between sub-sea or surface operating installations and coastal operating installations. Such flexible pipelines are of the type known as flow lines.

Flexible pipelines of the flow line type may, in certain cases, be protected when used on seabed by being covered with a certain depth of sediment or of a filling material, known as depth of cover, so as to be protected from any damage due to shipping or to the environment or for the purpose of not being subjected to the action of the current and/or the swell.

This protection may typically be achieved by digging a trench or furrow in the seabed, placing the flexible pipeline in this trench, then allowing the trench to fill naturally or, preferably, by filling the trench. This is then known as burying.

There are also other ways of protecting a flexible pipeline, for example covering the flexible pipeline, laid on the seabed, with rocks or any other filling material then known as rock dumping or gravel dumping, or with bags filled with gravel or cement as described in patent FR 2,602,300. This is then known as sand bagging.

In all cases, the problem of a variation in the length of the flexible pipeline thus protected, under the effect of the internal pressure or of expansions of thermal origin (as temperature variations may reach 100° C. and more) arises, because the buried or covered flexible pipeline is not free to deform laterally or downwards, and its extension, localized to individual regions where the depth of cover is less or there is fluidized sediment, may then lead to the formation of one or more buckling loops of a significant height and to the emergence of all or part of the flexible pipeline, something which is of course unacceptable.

Reference will usefully be made to the publication by the French Petroleum Institute entitled "Flambage vertical des conduites ensouillées [vertical buckling in buried pipelines]", published in the magazine of the French Petroleum Institute, volume 37, No. 1, January/February 1982, which examines from the theoretical and the experimental point of view the risk of buckling in flexible pipelines and of the formation of at least one buckling loop, as a function of the pressure inside the flexible pipeline and of the stiffness of this pipeline.

Since 1980, the Applicant Company has manufactured and laid several hundreds of kilometers of buried or covered flexible pipeline. These pipelines all have a reinforcing layer for withstanding circumferential components of the internal pressure, called a pressure arch, and reinforcing layers for mainly withstanding tension, known as tension reinforcing layers, and tend to lengthen under the effect of an increase in internal pressure. The tension reinforcing layers are overspecified in order to give the pipeline a significant stiffness and benefit from the fact that the stiffer the pipeline, the higher the critical pressure, that is to say the internal pressure to which the flexible pipeline must be subjected in order to cause a buckling loop to appear.

Despite their special design, these known flexible pipelines have to be buried under a significant depth of cover, to avoid any risk of one or more buckling loops emerging.

By way of indication, for a pipeline inside diameter of between 2 and 18 inches, and a service pressure of between 100 and 400 bar, the depth of cover is usually between 1 m 50 and 2 m 50 and the pipelines are therefore considerably time-consuming and expensive to lay.

To avoid the appearance of buckling loops, efforts have been made to design flexible pipelines that are dimensionally stable in terms of length, specially intended for burying.

Thus, publication U.S. Pat. No. 5,024,252 proposes a flexible pipeline especially intended for burying, of the rough bore type, comprising, from the center outwards:

an unsealed crush-resistant reinforcing layer, also known as an internal carcass, typically consisting of a helical winding of a clipped profile, for example a steel tape, at least one polymeric layer covering the internal carcass and constituting a sealing barrier, two pairs of crossed reinforcing plies of helically-wound steel wires, a protective external polymeric jacket.

The reinforcing plies of each pair are crossed, that is to say that the wires which form them are wound with opposing helix angles with respect to the longitudinal direction of the pipeline, so that the pipeline is stable in torsion, and the winding angles are chosen to give the pipeline dimensional stability in the direction of its length. The wires of one of the pairs of crossed plies are thus wound at a helix angle of between 40° and 53°, and the wires of the other pair are wound at a helix angle of between 57° and 70°, the said helix angles being measured with respect to the longitudinal direction of the pipeline.

There has also been proposed, in publication EP 147,288, a flow line specially intended to be buried, also of the rough bore type, comprising, from the center outwards:

an internal carcass, a sealing barrier, a reinforcing layer which mainly withstands the circumferential component of the internal pressure, and consists of a helical winding of a steel wire at a helix angle greater than 85° with respect to the longitudinal direction of the pipeline, and of stiffness $K_p$, two crossed plies of steel wires wound in a helix at an angle at most equal to 55°, mainly providing resistance to tension, and of stiffness $K_t$, an outer protective jacket.

The ratio $K_t/K_p$ is high, typically greater than or equal to 3, in order to give the pipeline lengthwise stability.

The flexible pipelines proposed in the aforementioned two patents are relatively expensive. A flexible pipeline such as described in patent EP 147,288 may even tend to shorten under the effect of an increase in the internal pressure and to lengthen when it returns to a lower pressure, depending on the value of the ratio $K_t/K_p$. Thus, when such a flexible pipeline is laid in a trench running across a dip in the seabed, and describes a downwards loop to follow the concaveness of the bed, it tends, when pressurized, to shorten and to move out of the trench. Once it is out of its trench, the pipeline lengthens, in the event of a reduction in the internal pressure, and forms an emerging buckling loop.

SUMMARY OF THE INVENTION

The present invention is intended to overcome the aforementioned drawbacks and aims particularly to reduce the overall cost of the flexible pipelines installed by reducing the cost of manufacture and the cost of laying.

The invention achieves this thanks to the novel use of a flexible pipeline comprising a sealing barrier and reinforcing layers for withstanding mechanical stresses, these layers being arranged around the said sealing barrier, these reinforcing layers consisting of a set of at least two crossed plies of wires helically wound, the respective winding angles $a_i$ of the individual wires of these plies respecting the relationships: for the wires i=1, 2, . . . , $52° \leq a_i \leq 58°$, preferably $54° \leq a_i \leq 56°$, the arithmetic mean $a_m$ of these winding angles $a_i$ all of the wires furthermore satisfying the relationship:

$$53° \leq a_m \leq 57°$$

and preferably $$54° \leq a_m \leq 56°.$$

The wires of the reinforcing plies of the novel used to be buried, in accordance with the invention, are thus wound at angles that are close to a particular angle known as the equilibrium angle, which corresponds to obtaining a pipeline that is dimensionally stable in service. The theoretical value of the equilibrium angle for a pipeline subjected only to the internal pressure or to variations in temperature, determined by calculation in the way known per se, is equal to approximately 55°.

In practice, bearing in mind, in particular, the manufacturing tolerances, the wires of the reinforcing plies are practically never wound at the equilibrium angle. However, through misuse of language, in what follows the reinforcing plies will be qualified as "in equilibrium" when the wires are wound in a helix at a winding angle that satisfies the aforementioned relationships, therefore close to the equilibrium angle.

The present invention relies on the observation, which was unexpected and contrary to existing beliefs, that a flexible pipeline, whose reinforcing layers for withstanding tension and internal pressure, more generally for withstanding mechanical stresses, consist merely of reinforcing plies that are crossed and in equilibrium with the exclusion of any pressure arch, can be buried or covered with a depth of cover which is very much lower than the depth of cover needed for pipelines of the prior art intended particularly for burying.

When the flexible pipeline is placed in the bottom of a trench, the depth of this trench may be as shallow as the outside diameter of the pipeline. The pipeline in this case is buried until its upper surface lies flush and the depth of cover can be considered as practically zero.

However, in practice, in the free state, a flexible pipeline, whose reinforcing layers for withstanding mechanical stresses consist only of plies which are crossed and in equilibrium, is not dimensionally stable, especially in the lengthwise direction because the winding angle of the wires is rarely strictly equal to the equilibrium angle, bearing in mind the manufacturing tolerances.

Flexible pipelines of this type have therefore been used, before the invention, only suspended and immersed from supports, for example floating supports or platforms (in this case one talks of risers or dumpers) or laid on the seabed without covering when the flexible pipelines do not need to be protected.

The variations in length of such installed pipelines are considerable and random, and far greater than is the case for the special flexible pipelines intended to be buried or covered, but without drawbacks in the above applications because of the freedom of the flexible pipelines to deform.

By contrast, these significant and random variations in length have led to the use of the said flexible pipelines for burying or covering being dismissed, until the Applicant Company observed that, surprisingly, this type of pipeline did not buckle when buried or covered.

An attempt at explaining this must lie in the fact that it is the particular flexibility, hitherto unexploited for burying or covering, exhibited by this type of flexible pipeline which might allow it not to buckle under the effect of the internal pressure and/or variations in temperature, the contact forces exerted by the sediment or the filling material on the flexible pipeline being sufficient, against all expectations, to prevent the formation of one or more buckling loops in the flexible pipeline. Thanks to the invention, the depth of cover may thus not exceed 0.5 m, and the laying of the flexible pipelines is considerably simplified.

According to a first advantageous feature of the invention, the radially inmost reinforcing ply consists of a winding of clipped profiled wires, and this makes it possible to obtain increased resistance to internal pressure, as described in patent EP 489,896.

According to another advantageous feature of the invention, which is advantageously combined with the first, the flexible pipeline comprises more than two plies which are crossed and in equilibrium.

As a preference, the flexible pipeline is placed in the bottom of a trench dug in the seabed, the depth of cover being less than or equal to 50 cm.

As an alternative, the flexible pipeline is laid on the seabed then covered with a filling material to a depth of cover of less than or equal to 0.5 m.

BRIEF DESCRIPTION OF THE DRAWINGS

Other features and advantages of the present invention will become clear upon reading the detailed description which will follow, of one non-limiting embodiment of the invention, and from examining the drawing of which the single FIG. 1 is a diagrammatic view, with cutaway, which shows the various constituent layers of a flexible pipeline 1 intended to be used in accordance with the invention.

DESCRIPTION OF THE PREFERRED EMBODIMENT

This flexible pipeline 1 is of the type comprising, in succession, from the center outwards:

an unsealed internal carcass 2, resistant to crushing and to external pressure, typically consisting in a way known per se of a short-pitch helical winding of one or more clipped profiles, a sealing barrier 3, typically consisting of one or more layers of polymer, a first reinforcing ply 4 consisting of wires, typically metal wires, wound in a helix around the sealing barrier 3 with a winding angle $a_1$ with respect to the longitudinal direction X of the pipeline 1, a second reinforcing ply 5 consisting of wires, typically metal wires, wound in a helix around the first reinforcing ply 4 with a winding angle $a_2$ the opposite to that of the wires that constitute the first reinforcing ply 4, so as to give torsional stability to the flexible pipeline, an intermediate coating 6, typically consisting of a strip of textile material, a protective jacket 7, typically made of elastomeric material.

In a particular embodiment, the flexible pipeline 1 has an inside diameter equal to 101.4 mm (4") and an outside diameter equal to 152.4 mm (6"). The internal carcass consists of the helical winding of a clipped steel tape 40 mm wide, 0.8 mm thick, the thickness of the carcass being equal to 4 mm. The sealing barrier 3 consists of a "Rilsan" sleeve 5 mm thick. The first reinforcing ply 4 consists of clipped steel wires with a T-shaped cross-section, wound in a helix around the sealing barrier 3 with a winding angle $a_1$ equal to 53.2°, the thickness of the reinforcing ply 4 being 3 mm. The second reinforcing ply 5 consists of the helical winding around the first reinforcing ply 4 of steel wires of rectangular section with a winding angle $a_2$ equal to 55.9°, the thickness of the reinforcing ply 5 being 3 mm. The intermediate coating 6 consists of a strip of textile material, such as that marketed by the company "CHOMARAT", 0.5 mm thick. The protective jacket 7 consists of a "Rilsan" sleeve 5 mm thick.

The flexible pipeline is laid using the same techniques as are already employed for the known special pipelines specially intended to be buried. However, laying becomes quicker and less expensive thanks to the invention because the depth of cover is less, or even zero.

A 650 m length of flexible pipeline corresponding to the aforementioned particular embodiment was buried in the bottom of a trench, the depth and the width of which slightly exceeded the outside diameter of the pipeline. The pipeline was subjected, in one case, to an internal test pressure of 430 bar at ambient temperature, and in another case to atmospheric pressure at a temperature of 80° C., and in yet another case to a service pressure of 350 bar at a temperature of 60° C. No formation of a buckling loop was observed whatever the test conditions, even in very severe conditions close to the rupture pressure of the pipe, which in the example in question was 500 bar, and this implies that this type of structure has no critical pressure, unlike the known structures intended to be buried or covered.

When the flexible pipeline is intended to be used for transporting fluids at very high pressure and at high temperature, the number of reinforcing plies is advantageously increased, the winding angle $a_i$ for the wires of each reinforcing ply i satisfying:

$$58° \geq a_i \geq 52°$$

preferably $$56° \geq a_i \geq 54°,$$

the arithmetic mean $a_m$ of the winding angles of the wires for all of the reinforcing plies i satisfying the relationship:

$$57° \geq a_m \geq 53°$$

preferably $$56° \geq a_m \geq 54°.$$

Finally, the invention, thanks to the novel use which is contrary to the existing preconceptions of a flexible pipeline whose reinforcing layers for withstanding mechanical stresses consist of reinforcing plies that are crossed and in equilibrium, makes it possible, irrespective of the inside diameter of the pipeline, to reduce the cost of buried flexible pipelines thanks, on the one hand, to the relatively simple and very commonplace structure of pipelines used and, on the other hand, to the greater ease of laying.

Of course, the invention is applicable to any type of reinforcing ply, not only of the unbounded type which corresponds to the embodiment of FIG. 1, but also of the bounded layer type, that is to say a type in which the wires are embedded in a plastic. The wires may have any type of cross-section, rectangular or otherwise, and may be made of metal or of a composite material. The wires constituting the reinforcing ply adjacent to the sealing barrier may be clipped or unclipped. However, the best resistance to internal pressure will be obtained if the reinforcing ply adjacent to the sealing barrier is made from a clipped profiled wire as described with reference to FIG. 1, which may have the overall shape of a T, a U or a Z in cross-section. As an alternative, the internal carcass may consist of clipped profiled wires or of differing cross-sections, for example wires with respective cross-sections in the shape of a U and of a T, as is known from French patent 90/08298 in particular.

The invention is applicable to any flexible pipeline comprising, in addition to the reinforcing plies for with-standing mechanical stresses which are in equilibrium and arranged around the sealing barrier, one or more additional layers arranged either between the reinforcing plies or under or over the latter, and intended for example to overcome a particular problem in the manufacturing of the pipeline.

These additional layers which play no part in the mechanical strength of the flexible pipeline and which do not constitute reinforcing plies within the meaning of the present invention, may have various winding angles of between 10 and 90°, without departing from the scope of the present invention.

The invention is as applicable to a flexible pipeline of the rough bore type as described previously, that is to say one which comprises an unsealed internal carcass for resisting crushing, as it is to a pipeline of the smooth bore type with no internal carcass.

What is claimed is:

1. A method of forming and installing a fluid transporting, flexible pipeline, at a seabed floor without the pipeline subsequently buckling through use, the method comprising:

forming a flexible pipeline by applying reinforcing layers around a tubular sealing barrier, the applied reinforcing layers comprising at least two crossed plies of wires and the applying comprising helically winding the reinforcing layers at respective winding angles $a_i$ with respect to the longitudinal direction of the pipeline wherein the winding angles $a_i$ are all close to an equilibrium angle, the respective winding angles $a_i$ of the individual wires i=1, 2 . . . being in the range of $52° \leq a_i \leq 58°$ and the arithmetic mean value $a_m$ of the winding angles $a_i$ of all of the wires being in the range of 53° to 57°;

the forming further comprising not applying a pressure arch to the pipeline; and selectively placing the flexible pipeline with the applied reinforcing layers and without a pressure arch in the depth range between being on the seabed floor without material on the pipeline to a depth beneath material at the seabed floor, the depth beneath material on the seabed floor being short enough that the material at the seabed floor would not supply enough force to prevent buckling of the flexible pipeline as it is pressurized in use.

2. The method of claim 1, wherein the winding angles $a_i$=1, 2 . . . , satisfy the relationship for $54° \leq a_i \leq 56°$.

3. The method of claim 2, wherein the arithmetic mean $a_m$ of the winding angles $a_i$ satisfies the relationship $54° \leq a_m \leq 56°$.

4. The method of claim 1, wherein the winding angles $a_i$ are approximately 55°.

5. The method of claim 1, wherein the pipeline further comprises tubular internal carcass inside the sealing barrier.

6. The method of claim 1, further comprising providing one of the reinforcing plies adjacent to the sealing barrier in the form of a winding of clipped profiled wires.

7. The method of claim 1, further comprising:

forming a trench for the pipeline in the seabed floor, and the placing of the pipeline comprises placing the pipeline in the trench, and applying cover of the material over the pipeline in the trench to a depth of cover of at most 0.5 m.

8. The method of claim 1, further comprising the placing of the pipeline comprises placing the pipeline on the seabed floor and then covering the pipeline on the seabed floor with a the material at the seabed floor to a depth of cover at most 0.5 m.

* * * * *